US012737624B2

(12) United States Patent
Matsuo et al.

(10) Patent No.: US 12,737,624 B2
(45) Date of Patent: Sep. 15, 2026

(54) LEARNING APPARATUS, ANOMALY DETECTION APPARATUS, LEARNING METHOD, ANOMALY DETECTION METHOD, AND PROGRAM

(71) Applicant: NTT, Inc., Tokyo (JP)

(72) Inventors: Yoichi Matsuo, Tokyo (JP); Kengo Tajiri, Tokyo (JP)

(73) Assignee: NTT, Inc., Tokyo (JP)

( * ) Notice: Subject to any disclaimer, the term of this patent is extended or adjusted under 35 U.S.C. 154(b) by 616 days.

(21) Appl. No.: 18/262,098

(22) PCT Filed: Feb. 9, 2021

(86) PCT No.: PCT/JP2021/004784

§ 371 (c)(1),
(2) Date: Jul. 19, 2023

(87) PCT Pub. No.: WO2022/172330

PCT Pub. Date: Aug. 18, 2022

(65) Prior Publication Data

US 2024/0095521 A1 Mar. 21, 2024

(51) Int. Cl.
*G06N 3/08* (2023.01)

(52) U.S. Cl.
CPC .................................... *G06N 3/08* (2013.01)

(58) Field of Classification Search
CPC ........ G06N 3/08; G06N 3/045; G06N 3/0455; G06N 3/047; G06N 3/0499; G06N 3/084; G06N 3/088; G06N 3/0895; G06N 3/094; G06N 3/096; G06N 3/04; G06N 3/04154; G06F 11/07
See application file for complete search history.

(56) References Cited

U.S. PATENT DOCUMENTS

2020/0020098 A1* 1/2020 Odry .................. G06F 18/2433
2021/0011791 A1* 1/2021 Okanohara ......... G06F 11/0703
2021/0049452 A1* 2/2021 Fan ..................... G06N 3/0455
(Continued)

OTHER PUBLICATIONS

Mao, "Discriminative Autoencoding Framework for Simple and Efficient Anomaly Detection", IEEEAccess, Aug. 6, 2019. (Year: 2019).*
(Continued)

*Primary Examiner* — Dave Misir
(74) *Attorney, Agent, or Firm* — IPUSA, PLLC

(57) ABSTRACT

A learning apparatus according to one embodiment includes an input unit configured to input a normal data collection for a first system that is a target domain and to input a normal data collection for a second system that is a source domain. The learning apparatus includes a learning unit configured to train a model that includes a first autoencoder configured to input normal data for the target domain, based on the normal data collection for the first system and the normal data collection for the second system. The model includes a second autoencoder configured to input normal data for the source domain, and includes a discriminator configured to output a probability that output data is data representing a feature for any one of the target domain and the source domain, while using, as an input, output data, output data of a first encoder included in the first autoencoder or a second encoder included in the second autoencoder.

8 Claims, 4 Drawing Sheets

(56) References Cited

U.S. PATENT DOCUMENTS

| | | | | |
|---|---|---|---|---|
| 2021/0224606 | A1* | 7/2021 | Lee | G06N 3/0455 |
| 2021/0312674 | A1* | 10/2021 | Abrol | G06T 7/11 |

OTHER PUBLICATIONS

Y.Ikeda et al., "Human-Assisted Online Anomaly Detection with Normal Outlier Retraining", ACM SIGKDD 2018 Workshop ODD v5.0, Aug. 20, 2018.

Y.Ikeda et al., "Estimation of Dimensions Contributing to Detected Anomalies with Variational Autoencoders", arXiv:1811.04576v2 [stat.ML] Dec. 21, 2018.

Ajakan, H. et al., "Domain-adversarial neural networks", arXiv preprint arXiv: 1412.4446, Feb. 9, 2015.

* cited by examiner

LEARNING APPARATUS, ANOMALY DETECTION APPARATUS, LEARNING METHOD, ANOMALY DETECTION METHOD, AND PROGRAM

TECHNICAL FIELD

The present invention relates to a learning apparatus, an anomaly detection apparatus, a learning method, an anomaly detection method, and a program.

BACKGROUND ART

For business operators who operate information and communication technology (ICT) systems, it is one of the most important tasks to obtain a state of anomalies that occur within the ICT systems and quickly address the anomalies. For this reason, conventionally, approaches to early detect anomalies occurring within the ICT systems have been researched. In particular, an unsupervised anomaly detection approach using deep learning (DL) is proposed in which anomaly detection is performed by learning a normal state using normal data of the ICT system and by calculating a degree of a deviation from the normal state during testing (for example, Non-Patent Documents 1 and 2).

The ICT systems provide various services, and users who use these services have various tendencies. For this reason, a large amount of normal data is required to learn the normal state of the ICT system with the unsupervised anomaly detection approach using the DL. In general, because the ICT systems tend to have a normal time period greater than an abnormal time period, a large amount of normal data can be collected in the ICT systems that are operated for a long period of time.

CITATION LIST

Non-Patent Documents

[Non-Patent Document 1] Y. Ikeda, K. Ishibashi, Y. Nakano, K. Watanabe, K. Tajiri, and R. Kawahara, "Human-Assisted Online Anomaly Detection with Normal Outlier Retraining," ACM SIGKDD 2018 Workshop ODD v5.0, August 2018.

[Non-Patent Document 2] Y. Ikeda, K. Tajiri, Y. Nakano, K. Watanabe, K. Ishibashi, "Estimation of Dimensions Contributing to Detected Anomalies with Variational Autoencoders," AAAI-19 Workshop on Network Interpretability for Deep Learning, 2019.

SUMMARY OF INVENTION

Problem to be Solved by the Invention

However, in some cases, only a small amount of normal data can be collected. For example, a sufficient amount of normal data cannot be collected immediately after an ICT system is newly constructed. Therefore, the unsupervised anomaly detection approach cannot detect anomalies until a sufficient amount of normal data is collected.

Also, for example, in a case where the normal state of the ICT system changes upon providing a new service, conventional unsupervised anomaly detection approaches cannot be used, and thus anomalies cannot be detected until a sufficient amount of normal data is collected, as in the case discussed above. In view of the situation described above, one embodiment of the present invention is provided, and an object of the present invention is to realize unsupervised anomaly detection in a target system by using a small amount of normal data.

Solution to Problem

In order to achieve the object, a learning apparatus according to one embodiment includes an input unit configured to input a normal data collection for a first system that is a target domain and to input a normal data collection for a second system that is a source domain. The learning apparatus includes a learning unit configured to train a model that includes a first autoencoder configured to input normal data for the target domain, based on the normal data collection for the first system and the normal data collection for the second system. The model includes a second autoencoder configured to input normal data for the source domain, and includes a discriminator configured to use, as an input, output data of a first encoder included in the first autoencoder or a second encoder included in the second autoencoder to output a probability that the output data is output data representing a feature for any one of the target domain and the source domain.

Effects of Invention

Unsupervised anomaly detection in a target system can be realized with a small amount of normal data.

DESCRIPTION OF EMBODIMENTS

Figure 1:
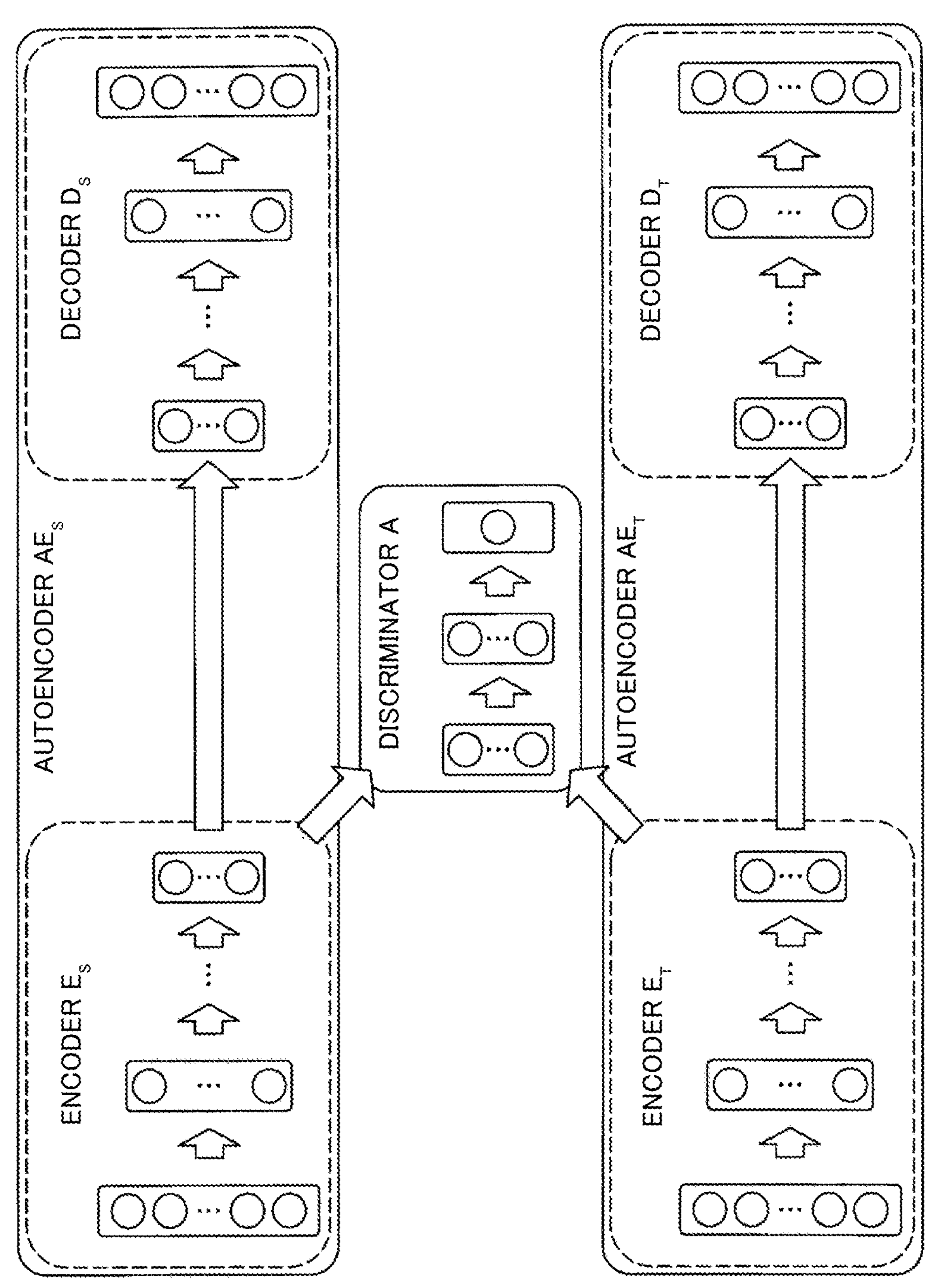
FIG. 1 is a diagram schematically illustrating an example of a model.

One embodiment of the present invention will be described below. In the present embodiment, in view of a fact that each of ICT systems has a different configuration and function but the ICT systems have similar normal states in a case where the ICT systems have similar configurations and functions, an unsupervised anomaly detection approach will be described, where the unsupervised anomaly detection approach transfers, to an ICT system having only a small amount of normal data, information that is obtained when learning a normal state of an ICT system having a large amount of normal data. With such an unsupervised anomaly detection approach, an anomaly detector capable of detecting an anomaly of the ICT system (hereinafter also referred to as a target system) having only the small amount of normal data can be obtained.

With the above unsupervised anomaly detection approach, an anomaly detection apparatus 10 that creates an anomaly detector and detects an anomaly in the target system through the anomaly detector will be described as follows.

<Unsupervised Anomaly Detection Approach>

Hereinafter, a theoretical configuration of the unsupervised anomaly detection approach according to the present embodiment will be described.

First, the ICT system having the large amount of normal data is given as a source domain S, and the ICT system having only a small amount of normal data (target system) is given as a target domain T.

Also, a piece of normal data that is obtained from the source domain S is represented as n-dimensional vector data $x_S=[x_1, \ldots, x_n]$, and a data set comprised of the n-dimensional vector data $x_S$ is represented by the following equation.

$$D_S = \{x_1, \ldots x_{|D_S|}\} \quad \text{[Math. 1]}$$

Here, n represents the number of types of data that is obtained from the source domain S, and $|D_S|$ represents the number of pieces of the n-dimensional vector data.

Likewise, a certain piece of normal data that is obtained from the target domain T is represented by m-dimensional vector data $x_T=[x_1, \ldots, x_m]$, and a data set comprised of the m-dimensional vector data $x_T$ is represented by the following equation.

$$D_T = \{x_1, \ldots x_{|D_T|}\} \quad \text{[Math. 2]}$$

Here, m represents the number of types of data obtained from the target domain T, and $|D_T|$ represents the number of pieces of the m-dimensional vector data.

Next, a model used with the unsupervised anomaly detection approach according to the present embodiment will be described. As an approach to detect anomalies in each of the source domain S and the target domain T, an autoencoder (AE), which is a kind of the DL, is used. See Non-Patent Documents 1 and 2 described above for details of the anomaly detection using the autoencoder.

The autoencoder is comprised of an encoder E and a decoder D, and is a model in which the encoder E compresses input data, and then the decoder D restores the compressed data. That is, an autoencoder AE is expressed by AE(x)=D(E(x)), where x is the input data.

The encoder E and the decoder D are each defined using a neural network. In the following description, a parameter of the neural network included in the encoder E is denoted as and a parameter of the neural network included in the decoder D is denoted as $\theta_D$. The number of layers of the neural network included in each of the encoder E and the decoder D can be arbitrarily set, but the number of layers of the neural network included in the encoder E needs to be the same as the number of layers of the neural network included in the decoder D. Further, for the neural network included in the encoder E, the number of dimensions of each of an intermediate layer and an output layer can be arbitrarily set, but the number of dimensions of an input layer needs to be the same as the number of dimensions of the input data. Also, for the neural network included in the decoder D, the number of dimensions of the intermediate layer can be arbitrarily set, but the number of dimensions of an input layer needs to be the same as the number of dimensions of the output layer in the encoder E, and further, the number of dimensions of the output layer needs to be the same as the number of dimensions of the input layer in the encoder E.

When training the autoencoder AE, a difference between input data x and output data AE(x) is calculated using a loss function L, and parameters $\theta_E$ and $\theta_D$ are learned such that the loss function L is minimized. That is, the parameters $\theta_E$ and $\theta_D$ are learned such that the loss function L set below is minimized.

$$L(\theta_E, \theta_D) = \|x - AE(x, \theta_E, \theta_D)\|_2 \quad \text{[Math. 3]}$$

In the following, an autoencoder used for the source domain S is represented by $AE_S$, and an autoencoder used for the target domain T is represented by $AE_T$. In this case, in the present embodiment, as an approach to transfer, to the autoencoder $AE_T$, information obtained when training the autoencoder $AE_S$, a model that includes a combination of the autoencoder $AE_S$ and the autoencoder $AE_T$ is used for a generative adversarial network (GAN)-based transfer learning approach as described in the reference document below.

Reference document "Ajakan, H., Germain, P., Larochelle, H., Laviolette, F., Marchand, M.: Domainadversarial neural networks. arXiv preprint arXiv: 1412.4446 (2014)"

Specifically, by extracting a feature quantity from each of the source domain S and the target domain T, a representation that can be transferred from the source domain S is acquired, and the representation is applied to the target domain T. This will be described below in detail.

Encoders of the autoencoders $AE_S$ and $AE_T$ are represented by the following equations.

$$E_S(\cdot, \theta_{E_S}), E_T(\cdot, \theta_{E_T}) \quad \text{[Math. 4]}$$

Outputs (that is, feature quantities derived by compressing normal data) of the encoders $$E_S(x_S, \theta_{E_S}), E_T(x_T, \theta_{E_T}) \quad \text{[Math. 5]}$$

are used as inputs, and a discriminator, which determines whether any one of the inputs is a feature quantity derived by compressing the normal data of the source domain S, or a feature quantity derived by compressing normal data of the target domain T, is represented by $A(\cdot, \theta_A)$. The discriminator A is defined using a neural network, and $\theta_A$ is a parameter of the neural network. Here, it is assumed that the discriminator A outputs a probability that the input data represents the feature quality derived by compressing the normal data of the source domain S. For the neural network included in the discriminator A, the number of layers, and the number of dimensions, of the intermediate layer can be arbitrarily set, but the number of dimensions of the input layer needs to be the same as the number of dimensions of the output layer in each of the encoders $E_S$ and $E_T$, and further, the number of dimensions of the output layer needs to be one.

The model comprised of the autoencoders $AE_S$, and $AE_T$ and the discriminator A as described above is set as a model to be trained. FIG. 1 shows a schematic diagram of the model. A pair $(x_S, x_T)$ of the n-dimensional vector data $x_S$ of the source domain S and the m-dimensional vector data $x_T$ of the target domain T is input to the model illustrated in FIG. 1. The n-dimensional vector data $x_S$ is compressed by the encoder $E_S$, and the compressed data (feature quality) is input to each of the decoder $D_S$ and the discriminator A. Likewise, the m-dimensional vector data $x_T$ is compressed by the encoder $E_T$, and the compressed data (feature quality) is input to each of the decoder $D_T$ and the discriminator A.

The loss function for the above-mentioned model is defined by the following equation.

$$L(\theta_{E_S}, \theta_{D_S}, \theta_{E_T}, \theta_{D_T}, \theta_A) = \alpha\|x_S - AE_S(x_S, \theta_{E_S}, \theta_{D_S})\|_2 + \beta\|x_T - AE_T(x_T, \theta_{E_T}, \theta_{D_T})\|_2 + \gamma(\log(A(E_S(x_S, \theta_{E_S}), \theta_A))) + \log(1 - A(E_T(x_T, \theta_{E_T}), \theta_A))$$ [Math. 6]

Where, $\alpha$, $\beta$, $\gamma>0$ are hyperparameters, and are used to adjust respective weights for the loss function.

With use of a data set $D_S$ of the source domain S and a data set $D_T$ of the target domain T, parameters are learned so as to minimize the loss function. That is, as described below, the parameters of the model are learned by minimizing a difference between the input and the output for each of the encoders $AE_S$ and $AE_T$, and by maximizing a probability that the discriminator A performs correct discrimination.

$$\min_{\theta_{E_S}, \theta_{D_S}, \theta_{E_T}, \theta_{D_T}} \max_{\theta_A} L(\theta_{E_S}, \theta_{D_S}, \theta_{E_T}, \theta_{D_T}, \theta_A)$$ [Math. 7]

There are various approaches to learn the parameters of the model, and an optimization technique such as Adam may be used, for example.

Instead of using equation 6 above, the loss function may be defined by the following equation.

$$L(\theta_{E_S}, \theta_{D_S}, \theta_{E_T}, \theta_{D_T}, \theta_A) = \alpha\|x_S - AE_S(x_s, \theta_{E_S}, \theta_{D_S})\|_2 + \beta\|x_T - AE_T(x_T, \theta_{E_T}, \theta_{D_T})\|_2 + \gamma(A(E_S(x_S, \theta_{E_S}), \theta_A)) + 1 - A(E_T(x_T, \theta_{E_T}), \theta_A)$$ [Math. 8]

In this case, the parameters of the model may be also learned using Equation 7 above.

In the present embodiment, the discriminator A outputs the probability that the input data represents the feature quality derived by compressing the normal data of the source domain S. However, such a manner is not limiting, and the discriminator A may output the probability that the input data represents the feature quality derived by compressing the normal data of the target domain T. In this case, "$\gamma$" of the third term of the loss function as given by Equation 6 above is read as "$-\gamma$," and "$\log(1-A(E_T(x_T, \theta_{E\_T}), \theta_A))$" of the fourth term is read as "$\log(A(E_T(x_T, \theta_{E\_T}), \theta_A))$." Likewise, "$\gamma$" of the third term of the loss function as given by Equation 8 above is read as "$-\gamma$," and "$1-A(E_T(x_T, \theta_{E\_T}), \theta_A)$" of the fourth and fifth terms is read as "$A(E_T(x_T, \theta_{E\_T}), \theta_A)$." In this case, $\theta_{E\_T}$ is a symbol that is obtained by adding "$E_T$" to the lower right of $\theta$.

Next, a case where anomaly detection in the target domain S (that is, anomaly detection in the target system) is performed will be described. The anomaly detection is performed using only an anomaly detector, where the autoencoder $AE_T$ (that is, the autoencoder $AE_T$ that is trained) included in a trained model as the anomaly detector. Specifically, m-dimensional vector data that is a target and is obtained from the target system is represented by the following equation, where anomaly detection is performed on the target.

$$\hat{x}_T$$ [Math. 9]

If the result of calculation set above exceeds a threshold it is determined to be abnormal, and it is determined to be normal otherwise.

$$\beta\|\hat{x}_T - AE_T(\hat{x}_T, \theta_{E_T}, \theta_{D_T})\|_2$$ [Math. 10]

Here, various approaches to set the threshold $\tau$ are contemplated, and for example, an approach to set $\tau=\mu+2\sigma$ is contemplated, where $\mu$ is an average, and $\sigma$ is a variance, of results that are obtained by performing a calculation using Equation 10 above for each m-dimensional vector data $x_T$ included in the data set $D_T$. However, this is an example, and the threshold $\tau$ may be set with any other approach. In the following text in the specification, the target m-dimensional vector data on which the anomaly detection is performed is denoted as "^$x_T$".

<Hardware Configuration of Anomaly Detection Apparatus 10>

Figure 2:
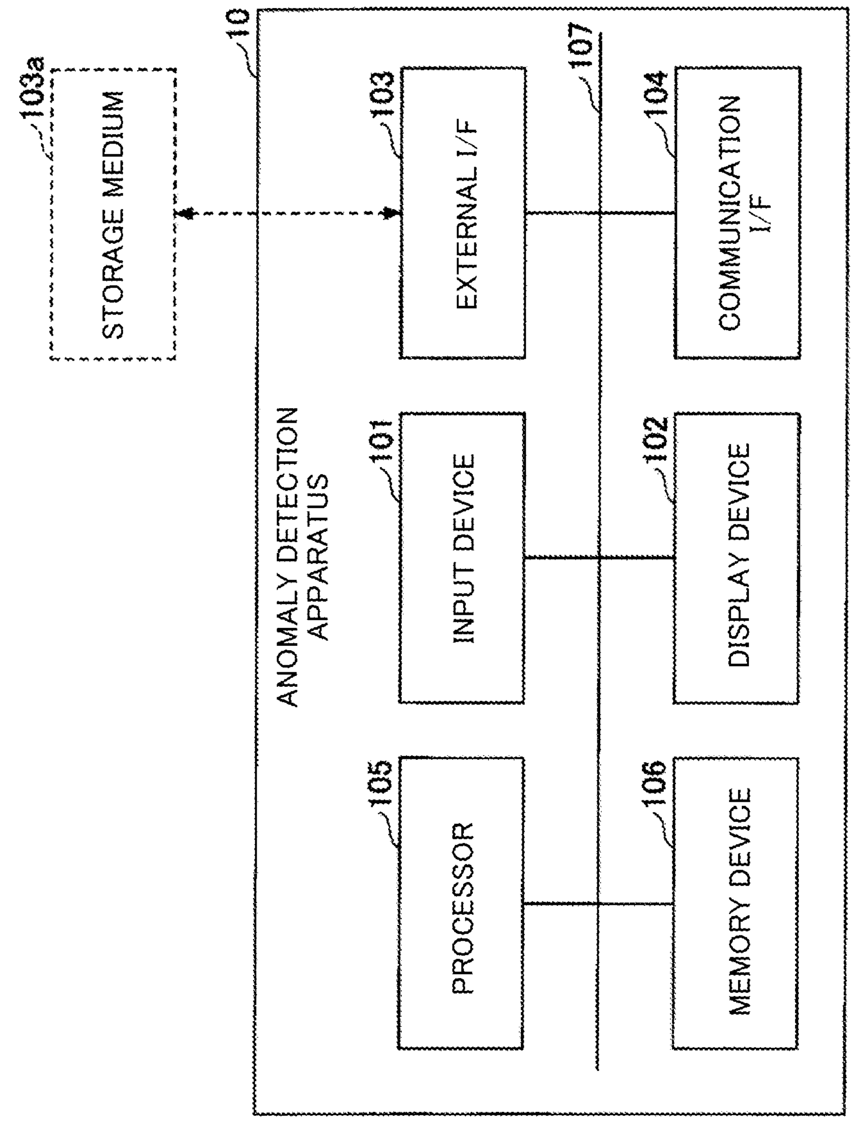
FIG. 2 is a diagram illustrating an example of a hardware configuration of an anomaly detection apparatus according to the present embodiment.

Next, a hardware configuration of the anomaly detection apparatus 10 according to the present embodiment will be described with reference to FIG. 2. FIG. 2 is a diagram illustrating an example of the hardware configuration of the anomaly detection apparatus 10 according to the present embodiment.

As illustrated in FIG. 2, the anomaly detection apparatus 10 according to the present embodiment is implemented by a hardware configuration of a general computer or computer system, and includes an input device 101, a display device 102, an external I/F 103, a communication I/F 104, a processor 105, and a memory device 106. Each of these hardware components are communicatively coupled to one another via a bus 107.

The input device 101 includes, for example, a keyboard, a mouse, or a touch panel, or the like. The display device 102 includes, for example, a display or the like.

The external I/F 103 is an interface with an external device such as a recording medium 103*a*. The anomaly detection apparatus 10 can perform reading and writing on the recording medium 103*a* via the external I/F 103. Examples of the recording medium 103*a* include a compact disc (CD), a digital versatile disk (DVD), a secure digital (SD) memory card, a universal serial bus (USB) memory card, and the like.

The communication I/F 104 is an interface used to couple the anomaly detection apparatus 10 to a communication network. The processor 105 may include, for example, various arithmetic devices such as a central processing unit (CPU) and a graphics processing unit (GPU). The memory device 106 may include, for example, various storage devices such as a hard disk drive (HDD), a solid state drive (SSD), a random access memory (RAM), a read only memory (ROM), and a flash memory.

The anomaly detection apparatus 10 according to the present embodiment has the hardware configuration illustrated in FIG. 2, thereby allowing for the various processing as described below. The hardware configuration illustrated in FIG. 2 is an example, and the anomaly detection apparatus 10 may have any other hardware configuration. For example, the anomaly detection apparatus 10 may include a plurality of processors 105, or may include a plurality of memory devices 106.

<Functional Configuration of Anomaly Detection Apparatus 10>

Figure 3:
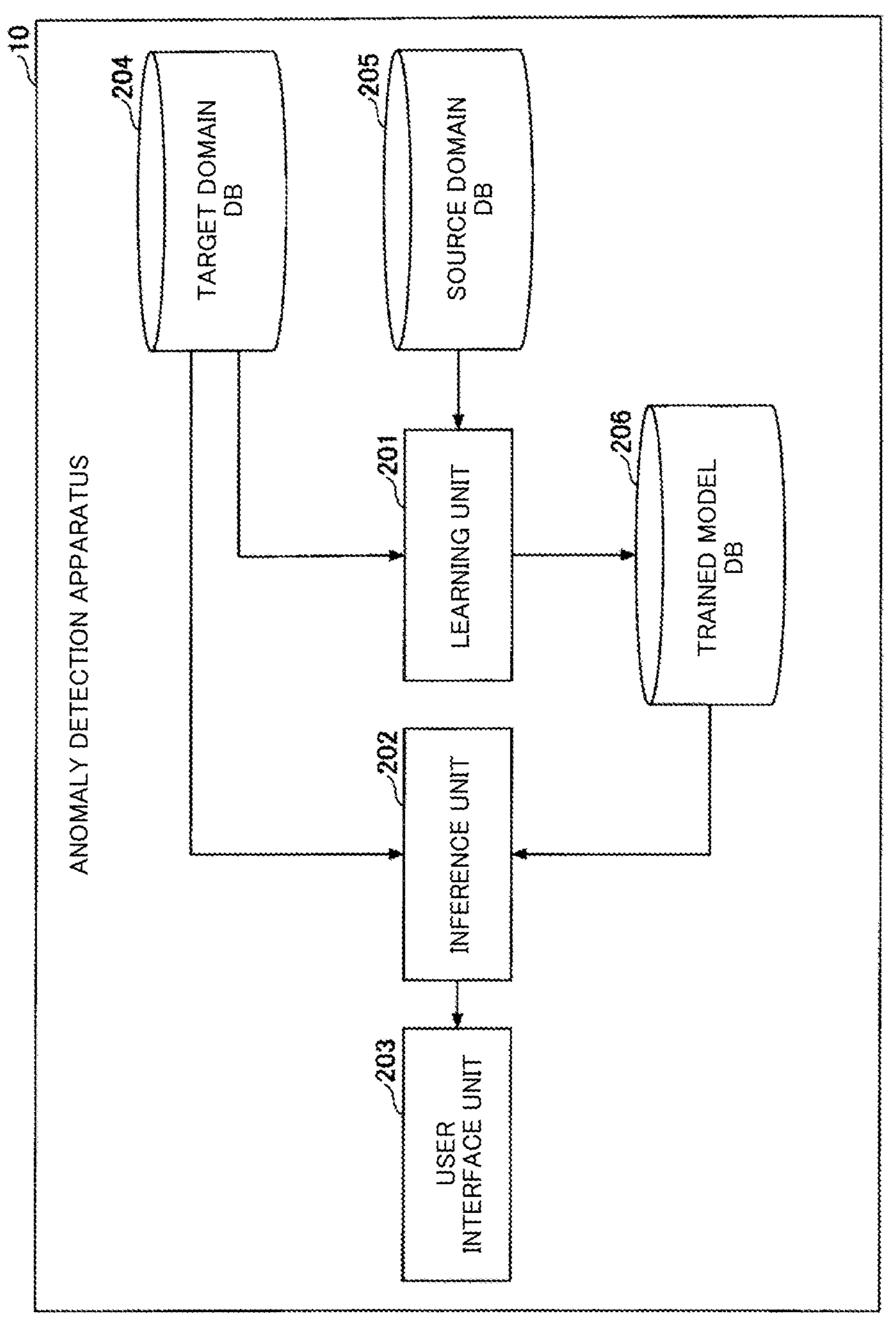
FIG. 3 is a diagram illustrating an example of a functional configuration of the anomaly detection apparatus according to the present embodiment.

Thereinafter, a functional configuration of the anomaly detection apparatus 10 according to the present embodiment will be described with reference to FIG. 3. FIG. 3 is a diagram illustrating an example of the functional configuration of the anomaly detection apparatus 10 according to the present embodiment.

As illustrated in FIG. 3, the anomaly detection apparatus 10 according to the present embodiment includes a learning unit 201, an inference unit 202, and a user interface unit 203. Each of these units is implemented, for example, by executing one or more programs by the processor 105, where the one or more programs are installed in the anomaly detection apparatus 10.

The anomaly detection apparatus 10 according to the present embodiment includes a target domain DB 204, a source domain DB 205, and a trained model DB 206. These databases (DBs) are implemented, for example, by the memory device 106.

The learning unit 201 trains the model illustrated in FIG. 1 (that is, the model comprised of the autoencoders $AE_S$ and $AE_T$ and the discriminator A) by using the m-dimensional vector data $x_T$ stored in the target domain DB 204 and the n-dimensional vector data $x_S$ stored in the source domain DB 205. A model (hereinafter also referred to as a trained model) trained by the learning unit 201 is stored in the trained model DB 206.

While using the autoencoder $AE_T$ included in the trained model stored in the trained model DB 206 as an anomaly detector, the inference unit 202 determines whether an anomaly has occurred in the target system by using the anomaly detector and the m-dimensional vector data $\hat{x}_T$ that is the target on which anomaly detection is performed.

The user interface unit 203 outputs a result of determination obtained by the inference unit 202 to a user. For example, the user interface unit 203 outputs the result of the determination to a terminal or the like that an operator or the like of the target system uses.

The target domain DB 204 stores the data set D T for the target domain T. The source domain DB 205 stores the data set D s for the source domain S. The trained model DB 206 stores one or more trained models.

The functional configuration of the anomaly detection apparatus 10 illustrated in FIG. 3 is an example, and any other functional configuration may be adopted. For example, functional units and DBs may be located in multiple apparatuses.

<Flow of Overall Process Executed by Anomaly Detection Apparatus 10>

Figure 4:
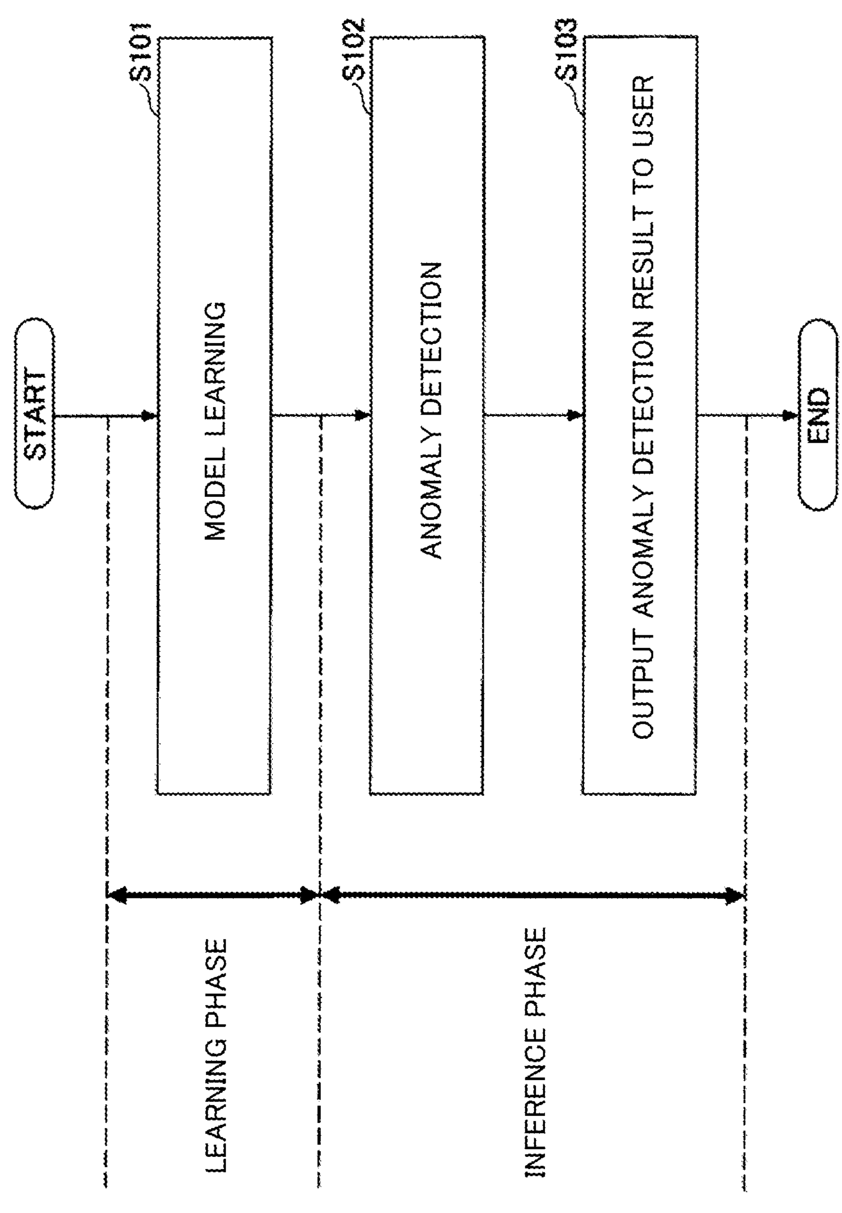
FIG. 4 is a flowchart illustrating a flow example of the overall process executed by the anomaly detection apparatus according to the present embodiment.

Hereinafter, a flow of the overall process executed by the anomaly detection apparatus 10 according to the present embodiment will be described with reference to FIG. 4. FIG. 4 is a flowchart illustrating an example of the flow of the overall process executed by the anomaly detection apparatus 10 according to the present embodiment. In this description, step S101 of FIG. 4 corresponds to the process in a learning phase, and steps S102 and S103 correspond to the process in an inference phase. The learning phase is a phase in which the model is trained, and the inference phase is a phase in which inference (that is, anomaly detection) is performed using the trained model.

Step S101: The learning unit 201 trains the model illustrated in FIG. 1 by using the m-dimensional vector data $x_T$ stored in the target domain DB 204 and the n-dimensional vector data $x_S$ stored in the source domain DB 205. That is, the learning unit 201 learns the parameters of the model based on Equation 7 above, by using an optimization technique such as Adam. Equation 6 or Equation 8 as described above may be used to define the loss function L.

Step S102: While using the autoencoder $AE_T$ included in the trained model stored in the trained model DB 206 as an anomaly detector, the inference unit 202 determines whether an anomaly has occurred in the target system by using the anomaly detector and the m-dimensional vector data $\hat{x}_T$ that is the target on which anomaly detection is performed. That is, if the result of calculation obtained using Equation 10 above exceeds the threshold value $\tau$, the inference unit 202 determines that it is abnormal, and otherwise it is determined to be normal.

Step S103: The user interface unit 203 outputs the result (normal or abnormal) of determination obtained in step S102 to the user. The user interface unit 203 may output the result to the user, only if the result of determination obtained in step S102 is abnormal.

As described above, in the anomaly detection apparatus 10 according to the present embodiment, even in a case where the target system has only a small amount of normal data, information on the normal state of the ICT system having a large amount of normal data is transferred to the target system, thereby enabling anomalies of the target system to be detected with the unsupervised anomaly detection approach using the DL.

As described above, the learning phase and the inference phase are present in the anomaly detection apparatus 10, and a single anomaly detection apparatus 10 enables the learning phase and the inference phase in the present embodiment. However, these phases may be respectively enabled by different apparatuses. The anomaly detection apparatus 10 in the learning phase may be also referred to as a "learning apparatus" or the like.

The present invention is not limited to the above embodiments described specifically, and various modifications, changes, and combinations of any other known techniques, and the like can be made without departing from the scope set forth in the claims.

REFERENCE SIGNS LIST

- 10 Anomaly detection apparatus
- 101 Input device
- 102 Display device
- 103 External I/F
- 103*a* Recording medium
- 104 Communication I/F
- 105 Processor
- 106 Memory device
- 107 Bus
- 201 Learning unit
- 202 Inference unit
- 203 User interface unit
- 204 Target domain DB
- 205 Source domain DB
- 206 Trained model DB

The invention claimed is:

1. An anomaly detection apparatus comprising:
circuitry configured to:
input (i) a normal data collection for a first system that is a target domain and (ii) a normal data collection for a second system that is a source domain;
train a model, the model including:
a first autoencoder configured to input normal data for the target domain, based on the normal data collection for the first system,
a second autoencoder configured to input normal data for the source domain, based on the normal data collection for the second system, and
a discriminator configured to use, as an input, output data, of a first encoder included in the first autoencoder, or a second encoder included in the second autoencoder, to output a probability that the output data is output data representing a feature for any one of the target domain and the source domain;
obtain target data for the first system on which anomaly detection is performed; and
determine whether an anomaly has occurred in the first system based on whether a difference between the target data and output data from the first autoencoder exceeds a threshold, by using only the first autoencoder included in the trained model,
wherein a first encoder included in the first autoencoder compresses the normal data collection for the first system and outputs a first feature quantity,
wherein a second encoder included in the second autoencoder compresses the normal data collection for the second system and outputs a second feature quantity,
wherein the discriminator is configured to use, as the input, the first feature quantity or the second feature quantity, to output a probability that the input is data representing a feature for any one of the target domain and the source domain, and
wherein the circuitry is configured to learn parameters of the model such that a difference between an input and an output of the first autoencoder and a difference between an input and an output of the second autoencoder are minimized, and the probability that the discriminator outputs is maximized.

2. The anomaly detection apparatus according to claim 1, wherein the circuitry is configured to learn parameters of the model such that,
a difference between an input and an output of the first autoencoder and a difference between an input and an output of the second autoencoder are minimized, and
the probability that the discriminator output is maximized.

3. The anomaly detection apparatus according to claim 1, wherein the number of pieces of data included in the normal data collection for the target domain is smaller than the number of pieces of data included in the normal data collection for the source domain.

4. An anomaly detection method executed by a computer, the anomaly detection method comprising:
determining whether an anomaly has occurred in a system that is a target on which anomaly detection is performed, by using (i) the first autoencoder included in the model trained by the anomaly detection apparatus according to claim 1 and (ii) data for the system.

5. The anomaly detection according to claim 1, wherein the circuitry is configured to learn parameters of the model such that a difference between an input and an output of the first autoencoder and a difference between an input and an output of the second autoencoder are minimized, and the probability that the discriminator outputs is maximized.

6. The anomaly detection according to claim 1, wherein the first encoder is configured to compress the normal data collection for the first system to output a first feature quantity, the second encoder is configured to compress the normal data collection for the second system to output a second feature quantity, and the discriminator is configured to use the first feature quantity or the second feature quantity as the input.

7. An anomaly detection method executed by a computer, the learning method comprising:
inputting (i) a normal data collection for a first system that is a target domain and (ii) a normal data collection for a second system that is a source domain; and
training a model, the model including:
a first autoencoder configured to input normal data for the target domain, based on the normal data collection for the first system,
a second autoencoder configured to input normal data for the source domain, based on the normal data collection for the second system, and
a discriminator configured to use, as an input, output data, of a first encoder included in the first autoencoder, or a second encoder included in the second autoencoder, to output a probability that the output data is data representing a feature for any one of the target domain and the source domain, and
obtaining target data for the first system on which anomaly detection is performed; and
determining whether an anomaly has occurred in the first system based on whether a difference between the target data and output data from the first autoencoder exceeds a threshold, by using only the first autoencoder included in the trained model,
wherein a first encoder included in the first autoencoder compresses the normal data collection for the first system and outputs a first feature quantity,
wherein a second encoder included in the second autoencoder compresses the normal data collection for the second system and outputs a second feature quantity,
wherein the discriminator is configured to use, as the input, the first feature quantity or the second feature quantity, to output a probability that the input is data representing a feature for any one of the target domain and the source domain, and
wherein the learning method further comprises learning parameters of the model such that a difference between an input and an output of the first autoencoder and a difference between an input and an output of the second autoencoder are minimized, and the probability that the discriminator outputs is maximized.

8. A non-transitory computer readable medium storing a program that causes a computer to execute the anomaly detection method according to claim 7.

* * * * *